US011297196B2

United States Patent
Oka

(10) Patent No.: US 11,297,196 B2
(45) Date of Patent: Apr. 5, 2022

(54) IMAGE FORMING APPARATUS WITH ORIGINAL READING MODE SETTABLE INDEPENDENTLY FOR A COPY OPERATION AND A SENDING OPERATION

(71) Applicant: CANON KABUSHIKI KAISHA, Tokyo (JP)

(72) Inventor: Yushi Oka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/094,296

(22) Filed: Nov. 10, 2020

(65) Prior Publication Data

US 2021/0168256 A1     Jun. 3, 2021

(30) Foreign Application Priority Data

Dec. 2, 2019   (JP) .............................. JP2019-218301

(51) Int. Cl.
  *G06F 3/12*  (2006.01)
  *H04N 1/00*  (2006.01)

(52) U.S. Cl.
  CPC ....... *H04N 1/00822* (2013.01); *H04N 1/0071* (2013.01); *H04N 1/00482* (2013.01); *H04N 1/00628* (2013.01); *H04N 1/00745* (2013.01); *H04N 1/00806* (2013.01)

(58) Field of Classification Search
  None
  See application file for complete search history.

(56) References Cited

U.S. PATENT DOCUMENTS

| | | | | |
|---|---|---|---|---|
| 5,198,853 A | * | 3/1993 | Ichihara | G03G 15/607 358/449 |
| 5,946,527 A | * | 8/1999 | Salgado | H04N 1/00713 399/82 |
| 10,447,876 B2 | | 10/2019 | Hamada et al. | H04N 1/00801 |
| 10,447,890 B2 | | 10/2019 | Mikami et al. | H04N 1/409 |
| 10,750,040 B2 | | 8/2020 | Oka et al. | H04N 1/00766 |
| 2016/0170692 A1 | * | 6/2016 | Osada | H04N 1/2104 358/1.15 |
| 2016/0286071 A1 | * | 9/2016 | Kadobayashi | H04N 1/00777 |
| 2017/0214816 A1 | | 7/2017 | Yamakawa et al. | H04N 2201/04755 |
| 2017/0269880 A1 | * | 9/2017 | Hayashi | H04N 1/00474 |
| 2018/0034991 A1 | * | 2/2018 | Osada | H04N 1/00822 |

(Continued)

FOREIGN PATENT DOCUMENTS

JP    2006-108858    4/2006

*Primary Examiner* — Dung D Tran
(74) *Attorney, Agent, or Firm* — Venable LLP

(57) ABSTRACT

An image forming apparatus includes an original reading unit; an image forming unit, an image data sending unit; and a mode setting unit for setting one of original reading modes including a first original reading mode for the original reading unit to read originals of the same size, and a second original reading mode for the original reading unit to read originals of different sizes; and a control unit for controlling the original reading unit and the image forming unit so as to execute a copy job including the original reading process and the image forming process, and a sending job including the original reading process and the sending process. The mode setting unit is capable of independently setting, for the copy job and the sending job, a default value indicating the first original reading mode or the second original reading mode.

10 Claims, 13 Drawing Sheets

(56) References Cited

U.S. PATENT DOCUMENTS

2018/0041648 A1* 2/2018 Tani ................... H04N 1/0044
2018/0097953 A1* 4/2018 Uchiyama .......... H04N 1/00649
2018/0314668 A1* 11/2018 Kawamoto ........ H04N 1/00095

* cited by examiner

|  | WIDTH [mm] | LENGTH [mm] |
|---|---|---|
| A3R | 297.0 | 420.0 |
| A4 | 297.0 | 210.0 |
| A4R | 210.0 | 297.0 |
| A5 | 210.0 | 148.5 |
| A5R | 148.5 | 210.0 |
| A6 | 148.5 | 105.0 |
| B4R | 257.0 | 364.0 |
| B5 | 257.0 | 182.0 |
| B5R | 182.0 | 257.0 |
| B6 | 182.0 | 128.5 |

Fig. 12

| THROUGHPUT IN A4-SIZE | |
|---|---|
| | THROUGHPUT [PAGE/MIN] |
| IMAGE PRINT | 50 |
| IMAGE READING (SS READING MODE) | 100 |
| IMAGE READING (MIXED READING MODE) | 60 |

IMAGE FORMING APPARATUS WITH ORIGINAL READING MODE SETTABLE INDEPENDENTLY FOR A COPY OPERATION AND A SENDING OPERATION

FIELD OF THE INVENTION AND RELATED ART

The present invention relates to an image forming apparatus including a reading unit for reading an original.

Generally, an image reading apparatus capable of executing an operation in a mixed reading mode in which in the case where originals with a plurality of sizes are stacked on an original tray, the size of each of the originals is discriminated during feeding and in which the original is read in conformity with the discriminated original size has been known. In the case of an operation in a normal mode in which the mixed reading mode is not designated, the original size is discriminated on the original tray and all the originals are regarded as having the same original size and then reading of the original is carried out using information on the same original size.

Conventionally, an image reading apparatus in which in the case where feeding of the originals with the plurality of sizes is detected in a state in which an original reading mode is set at the normal mode, an operation explanation screen in the mixed reading mode is displayed on a liquid crystal display portion has been proposed (Japanese Laid-Open Patent Application 2006-108858).

Further, an image forming apparatus such as a multi-function machine in which an image reading apparatus is provided at an upper portion has also been known in general, and such an image forming apparatus has a plurality of functions including a reading process for reading the original, an image forming process for forming an image on recording paper, a process for sending data to an external device and the like.

SUMMARY OF THE INVENTION

A principal object of the present invention is to provide an image forming apparatus which has a plurality of functions such as an original reading process, an image forming process and a sending process and in which as to a copy operation and a sending operation, whether or either one of a first original feeding mode and a second original feeding mode should be set at a default is independently settable for each of the operations, and which is improved in usability.

According to an aspect of the present invention, there is provided an image forming apparatus comprising: an original reading unit configured to perform an original reading process for reading an original and generating image data corresponding to the read original; an image forming unit configured to perform an image forming process for forming an image on a recording sheet based on the image data generated by the original reading process; a sending unit configured to perform a sending process for sending image data generated by the original reading process to an external device; and a mode setting unit configured to set one of a plurality of original reading modes including a first original reading mode and a second original reading mode, the first original reading mode being a mode for the original reading unit to read originals of the same size, and the second original reading mode being a mode for the original reading unit to read originals of different sizes; and a control unit configured to control the original reading unit and the image forming unit to execute a copy job, and configured to control the original reading unit and the sending unit to execute a sending job, the copy job including the original reading process and the image forming process, and the send job including the original reading process and the sending process, wherein the mode setting unit is configured to independently set, for the copy job and the sending job, a default value indicating the first original reading mode or the second original reading mode.

Further features of the present invention will become apparent from the following description of exemplary embodiments with reference to the attached drawings.

Figure 9:
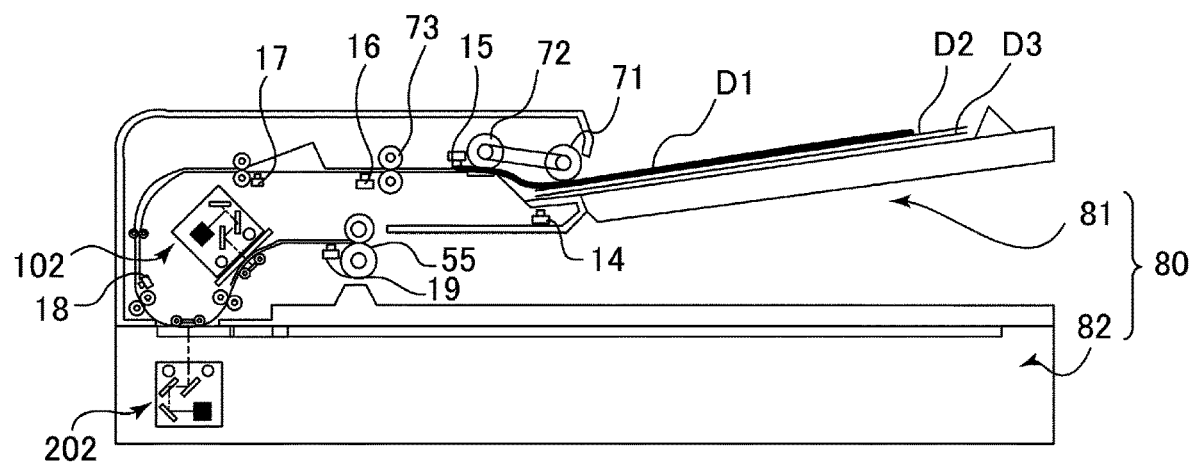
Figure 9:
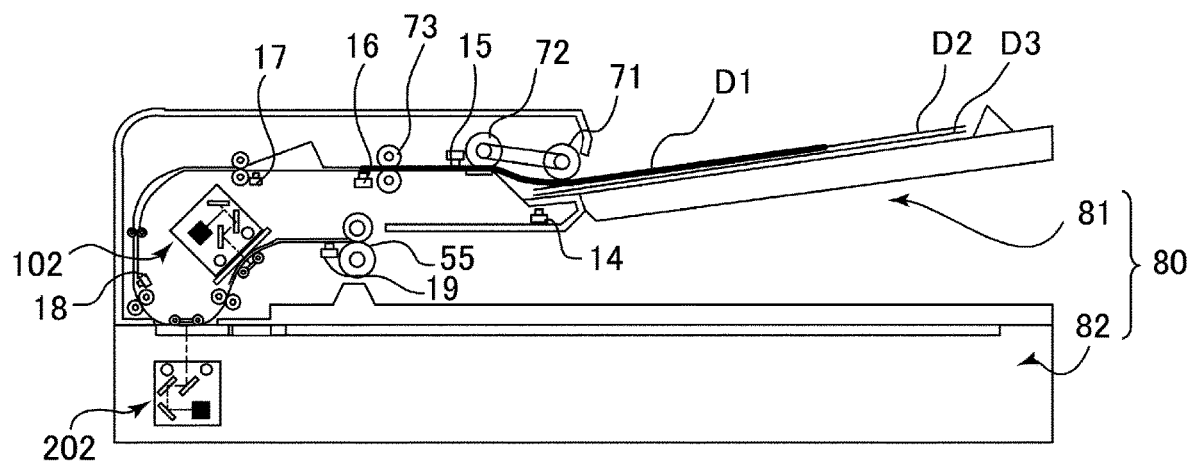

Part (a) of FIG. 9 is a sectional view showing a state in which feeding of the original is started, and part (b) of FIG. 9 is a sectional view showing a state in which a leading end of the original reaches a post-drawing sensor.

Figure 10:
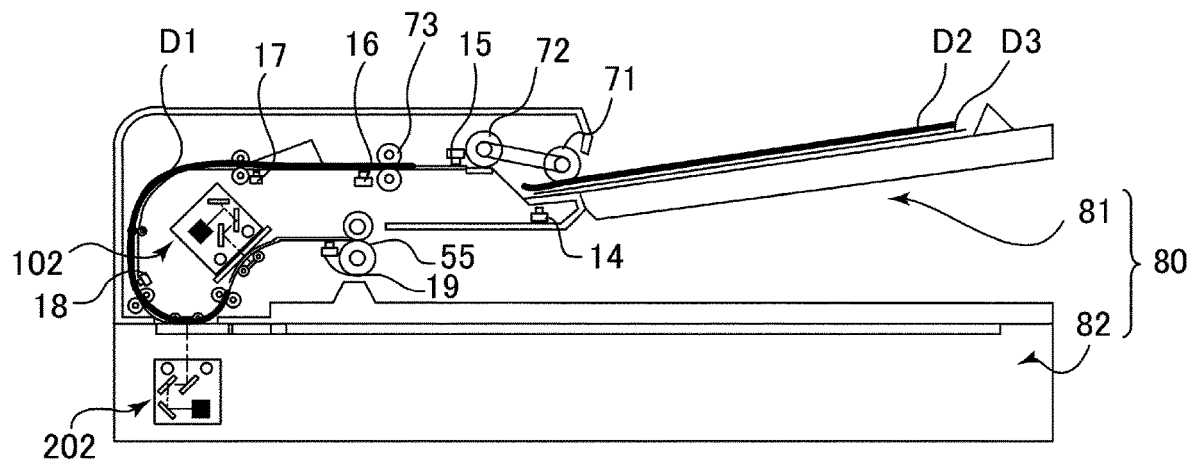
Figure 10:
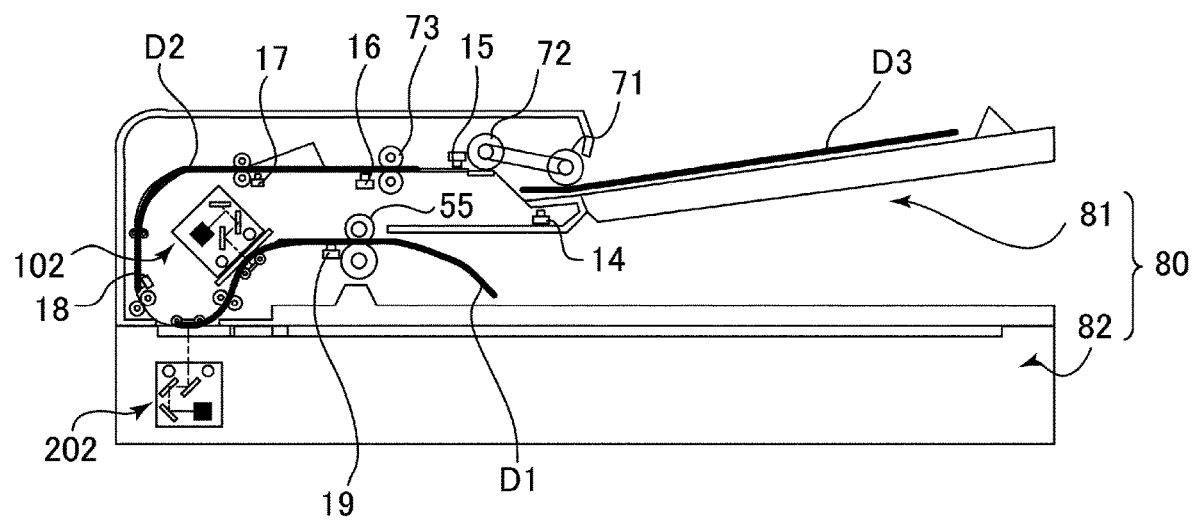

Part (a) of FIG. 10 is a sectional view showing a state in which feeding of a subsequent original is started, and part (b) of FIG. 10 is a sectional view showing a state in which a leading end of the subsequent original reaches a reading sensor.

Figure 11:
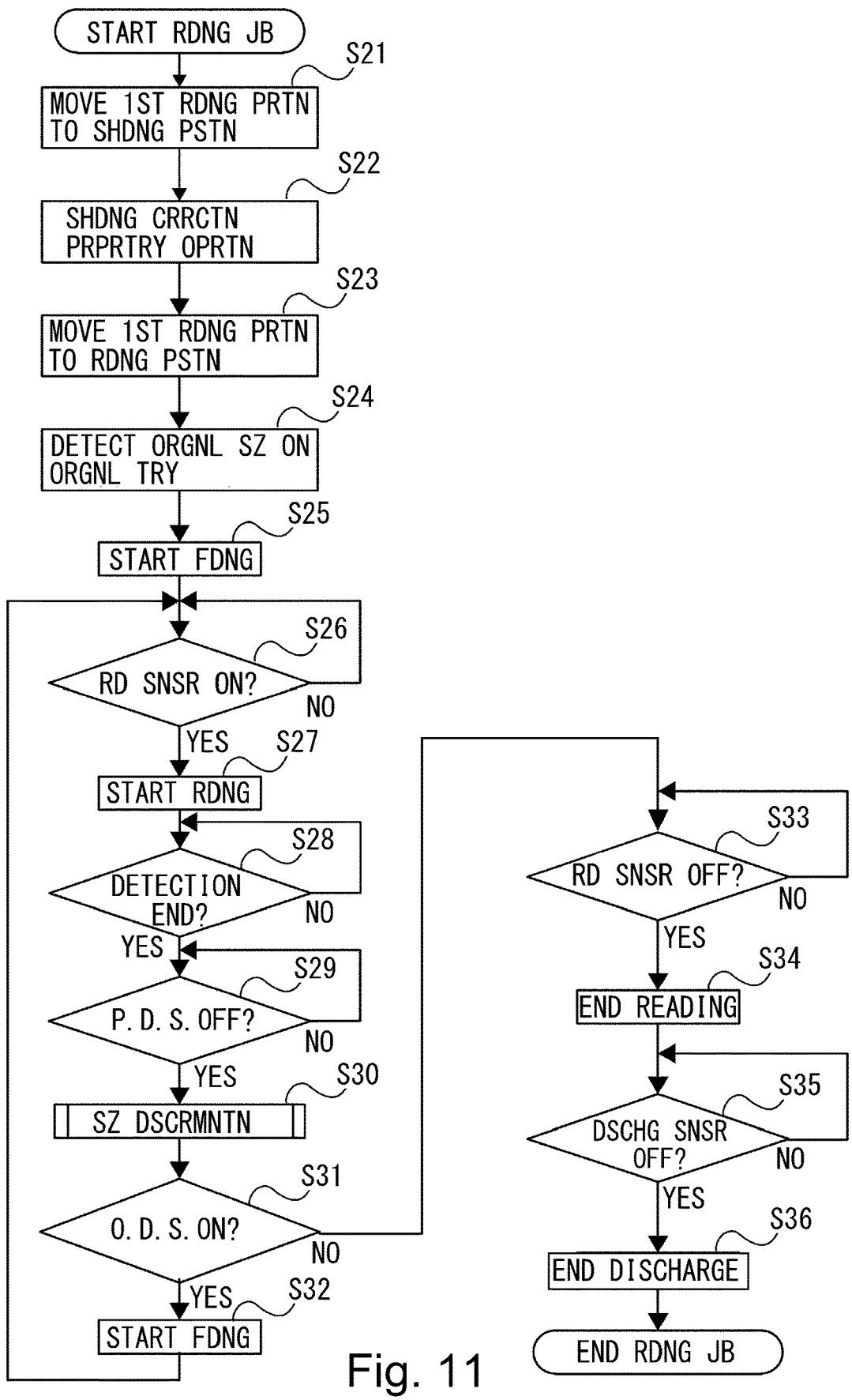

FIG. 11 is a flowchart showing a process of an ADF reading job in a mixed reading mode.

FIG. 12 is a table showing a width and a length of each of regular sizes.

Figure 13:
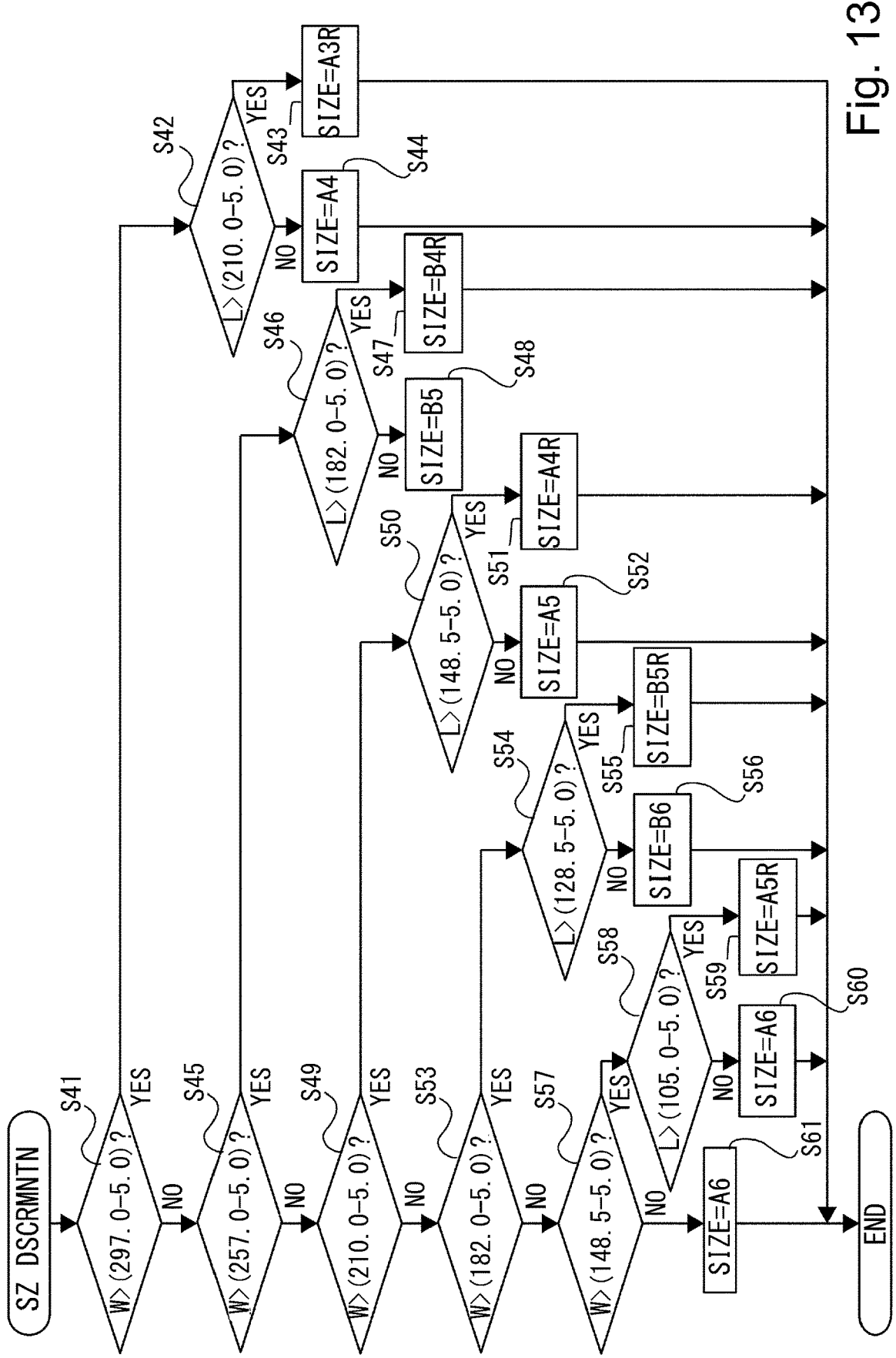

FIG. 13 is a flowchart showing an original size discriminating process.

Figures 14, 15:
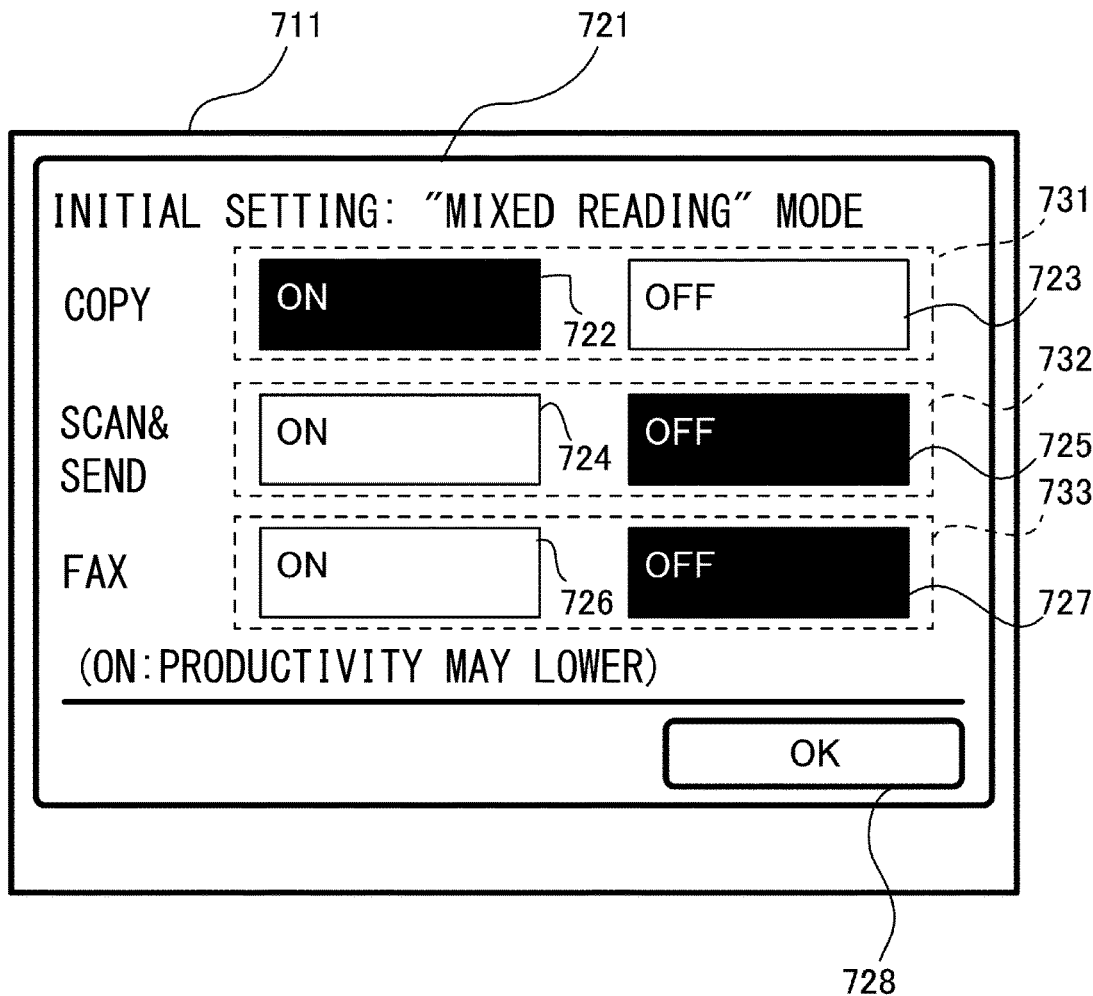

FIG. 14 is a table for comparing throughput.

FIG. 15 is a schematic view showing a change screen.

DESCRIPTION OF THE EMBODIMENTS

[General Structure]

Figure 1:
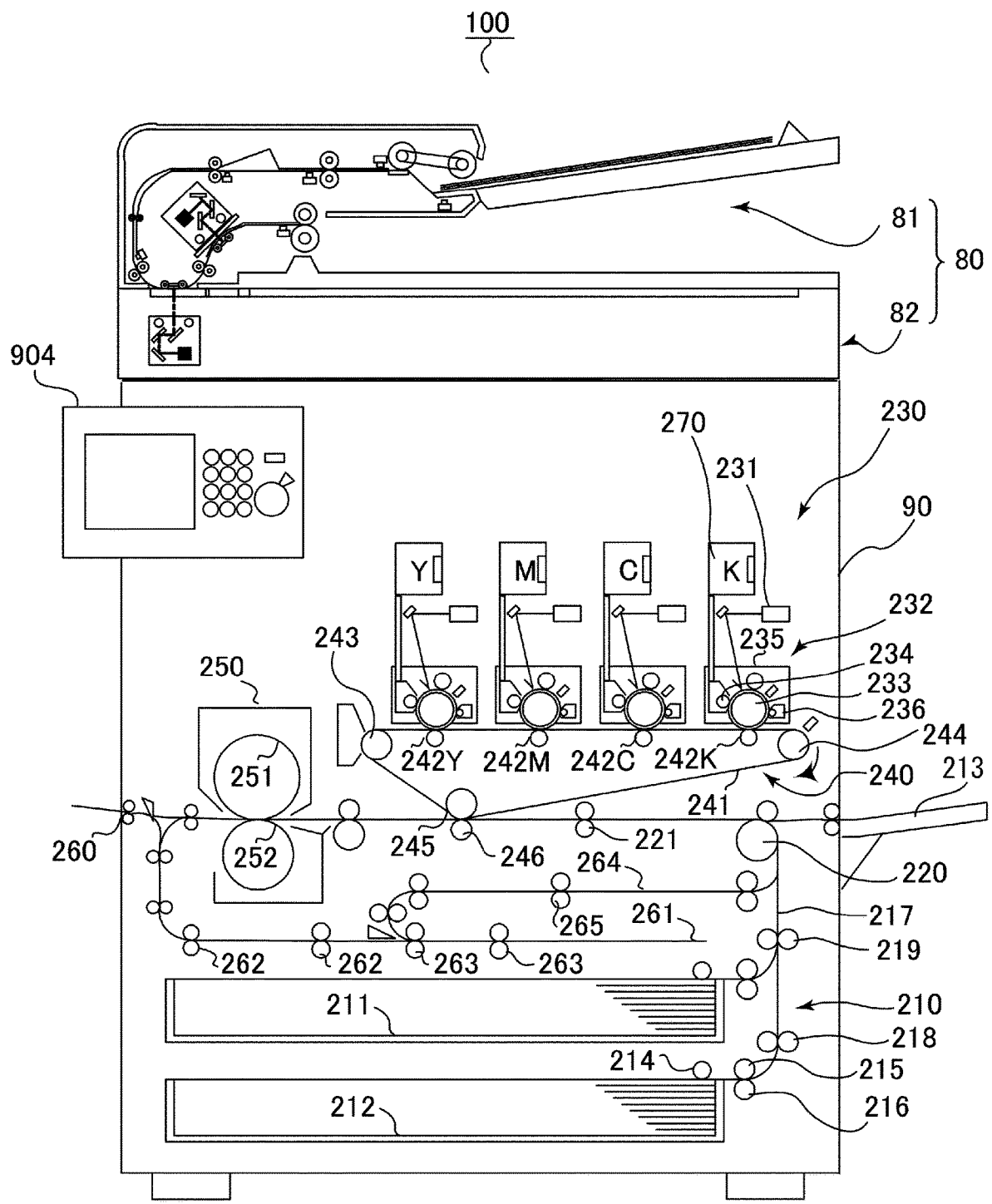
FIG. 1 is a schematic view showing entirety of a printer according to an embodiment of the present invention.

A printer 100 according to an embodiment of the present invention is a laser beam printer of an electrophotographic type. The printer 100 includes, as shown in FIG. 1, a printer main assembly 90 and an image reading apparatus 80 mounted on the printer main assembly 90. In the following, an original or a recording material (recording paper) includes, in addition to plain paper, special paper such as coated paper, paper with a special shape such as an envelope and index paper, and a plastic film for an overhead projector, a cloth, and the like.

The printer main assembly 90 includes a recording paper feeding portion 210 for feeding stacked recording paper, an image forming portion 230 for forming an image on fed recording paper, and an operation display portion 904 for changing various settings. Further, the printer 100 includes a fixing device 250 for fixing the image transferred on the recording paper and a discharging roller pair 260 for discharging, onto an unshown discharge tray or the like, the recording paper after fixation of the image.

The image forming portion 230 constitutes an image forming portion of a so-called four-drum full-color type including four laser scanners 231, four process cartridges 232 and an intermediary transfer portion 240. The process cartridges 232 form toner images of colors of yellow (Y), magenta (M), cyan (C) and black (K). Each of the process cartridges 232 includes a photosensitive drum 233, a developing device 234, a charging device 2235, a cleaner 236 and the like. At an upper portion of the image forming portion 230, toner cartridges 270 accommodating toners of the respective colors is mounted in the printer main assembly 90 so as to be mountable in and dismountable from the printer main assembly 90.

The intermediary transfer portion 240 includes an intermediary transfer belt 241 which is an intermediary transfer member, primary transfer rollers 242Y, 242M, 242C and 242K, a driving roller 243, a tension roller 244 and an inner secondary transfer roller 245. The intermediary transfer belt 241 is stretched and supported by the rollers such as the driving roller 243, the tension roller 244 and the inner secondary transfer roller 245, and the driving roller 243 is rotationally driven, so that the intermediary transfer belt 241 is rotated in an arrow direction shown in FIG. 1. Further, the intermediary transfer belt 241 is provided under the photosensitive drums 232 of the four process cartridges 232 so as to contact the photosensitive drums 232.

The primary transfer rollers 242Y, 242M, 242C and 242K are disposed so as to contact an inner peripheral surface of the intermediary transfer belt 241 at positions opposing the photosensitive drums 233 for the respective colors. A primary transfer portion is formed by each of the photosensitive drums 233 and the intermediary transfer belt 241. Further, at a position opposing the inner secondary transfer roller 245 through the intermediary transfer belt 241, an outer secondary transfer roller 246 is provided. The outer secondary transfer roller 246 contacts another peripheral surface of the intermediary transfer belt 241. A secondary transfer portion is formed by the intermediary transfer belt 241 and the outer secondary transfer roller 246.

The recording paper feeding portion 210 includes cassettes 211 and 212 and a manual feeding tray 213, on which sheets of the recording paper are stacked. The cassette 211 and 212 are disposed at, for example, a lower portion of the printer main assembly 90 and is constituted so as to be capable of being inserted in and extracted from the printer main assembly 90. Further, the normal feeding tray 213 is provided on a right side surface of the printer main assembly 90.

When the printer 100 receives an instruction to start an image forming operation, the photosensitive drum 233 is rotated, and a surface of the photosensitive drum 233 is electrically charged uniformly by the charging device 235. Then, the laser scanner modulates and outputs laser light on the basis of image data inputted through an input interface or from an external computer. The laser scanner 231 outputs the laser light and scans the surface of the photosensitive drum 233 with the laser light, whereby an electrostatic latent image based on the image data is formed on the surface of the photosensitive drum 233.

That is, on the photosensitive drums 233 of the process cartridges 232, the electrostatic latent images for yellow (Y), magenta (M), cyan (C) and black (K) are successively formed, respectively. The electrostatic latent images at yellow, magenta, cyan and black are visualized by toners supplied from the developing device 234, and are developed into toner images of the associated colors, respectively. The toner images of yellow, magenta, cyan and black formed on the photosensitive drums 233 are successively transferred superposedly onto the intermediary transfer belt 241 under application of a transfer voltage to the primary transfer rollers 242Y, 242M, 242C and 242K. By this, on the intermediary transfer belt 241, a full-color toner image is formed. The toner remaining on each of the photosensitive drums 233 after the toner image transfer is collected by the cleaner 236.

On the other hand, in the printer main assembly 90, in parallel to such an image forming operation, by the recording paper feeding portion 210, the recording paper is picked up from a selected accommodating place of the recording paper and then is fed toward the image forming portion 230. In the case of the printer 100 shown in FIG. 1 as an example, as the accommodating place of the recording paper, one place is selected from the cassettes 211 and 212 and the manual feeding tray 213. In this embodiment, as an example of the accommodating place of the recording paper, the case where the cassette 212 is selected will be described.

In the case where the cassette 212 is selected as the recording paper accommodating place, the recording paper stacked on the cassette 212 is sent by a pick-up roller 214 and is separated one by one by a feed roller 215 and a separation roller 216. The separated recording paper one by one is fed to a registration roller pair 221 by feeding roller pairs 218, 219 and 220 provided along a feeding passage 217. The recording paper fed to the registration roller pair 221 is abutted at a leading end thereof against a nip of the registration roller pair 221, so that oblique movement of the recording paper is corrected. Thereafter, the recording paper is timed to the toner images carried on the intermediary transfer belt 241 and is fed to the secondary transfer portion.

The toner images carried on the intermediary transfer belt 241 are collectively transferred onto the recording paper by a secondary transfer bias applied to the outer secondary transfer roller 246. The recording paper on which the toner images are transferred is fed to the fixing device 250 and is heated and pressed by a fixing roller 251 incorporating a heater and by a pressing roller 252. By this, the toner images on the recording paper are fixed on the recording paper. Temperatures of the fixing roller 251 and the pressing roller 252 are set at optimum temperatures depending on a kind of the recording paper.

In the case where the image formation on the recording paper is completed, the recording paper on which the toner images are fixed is discharged to an outside of the printer 100 by a discharging roller pair 260. Further, in the case where the recording paper is discharged with a printed surface down, the recording paper is once drawn into a reverse feeding passage 261 and then is discharged by the discharging roller pair 260. For example, in a copy(ing) operation, the recording paper is discharged with the printed surface down, so that the recording paper can be discharged in the same arrangement (orientation) as the read original.

On the other hand, in the case where images are formed on double sides (surfaces) of the recording paper, the recording paper on which first side (surface) the image is formed is guided to the reverse feeding passage 261. The recording paper guided to the reverse feeding passage 261 is one fed along the reverse feeding passage 261 by feeding roller pairs 262 and 263. After the recording paper is fed along the reverse feeding passage 261, rotation of the feeding roller pair 263 is reversed, so that the recording paper is fed to a double-side feeding passage 264. The recording paper fed to the double-side feeding passage 264 is fed from the double-side feeding passage 264 to the feeding passage 217 by a feeding roller pair 265 and then is fed to the registration roller pair 221 along the feeding passage 217. Thereafter, the image is also formed on a second surface of the recording paper similarly as the time of the image formation on the above-described first surface.

[Image Reading Apparatus]

Figure 2:
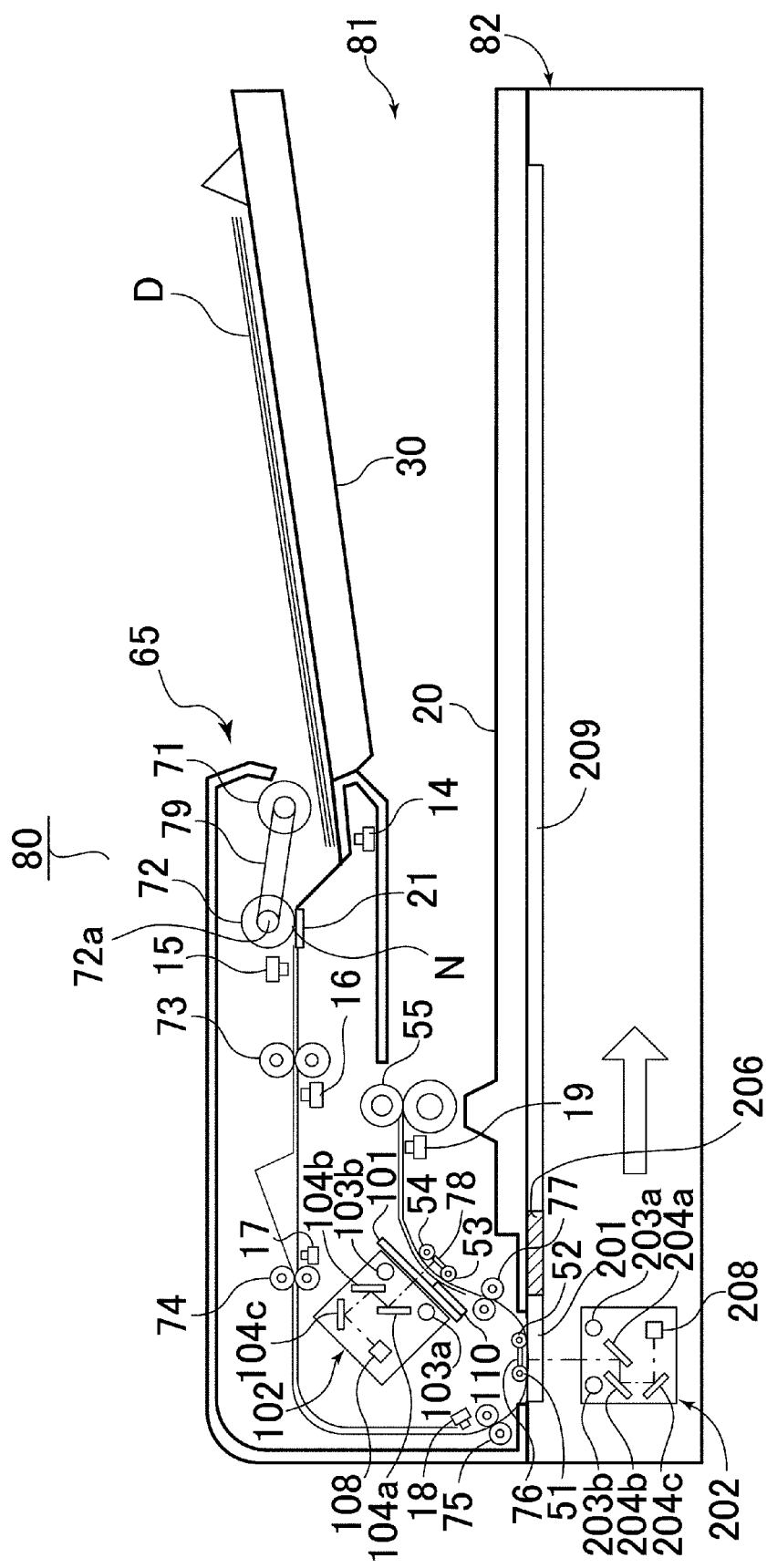
FIG. 2 is a sectional view showing an image reading apparatus.

Next, the image reading apparatus 80 will be described with reference to FIG. 2. The image reading apparatus 80 includes, as shown in FIG. 2, an ADF (Auto Document Feeder) 81 for feeding originals stacked on an original tray 30 as a stacking portion and for discharging the originals onto a discharge tray 20 and a reading unit 82 for reading the original fed by the ADF 81.

The ADF 81 is supported by hinges so as to be rotatable relative to the reading unit 82 so that an original supporting platen glass 209 is openable. Incidentally, an original D may be white paper or may also be an original on which an image is formed on one side or on double sides.

The ADF 81 includes a feeding unit 65, a drawing roller pair 73, feeding roller pairs 74, 75 and 77, platen rollers 51, 52, 53 and 54, glass opposing members 76 and 78, a discharging roller pair 55, and a second reading portion 102. The feeding unit 65 includes a feed roller shaft 72a, a feed roller 72 rotatably supported by the feed roller shaft 72a, a feeding arm 79, a feeding roller 71 and a separation pad 21.

The feeding arm 79 is rotatably supported about the feed roller shaft 72a, and the feeding roller 71 as a feeding portion is rotatably supported at a free end of the feeding arm 79. The feed roller shaft 72a is driven by a separation motor 805 (FIG. 4), and by rotation of the feed roller shaft 72a, the feed roller 72 and the feeding roller 71 are rotated. The originals fed by the feeding roller 71 are separated and fed one by one in a separation nip N as a separating portion formed by the feed roller 72 and the separation pad 21.

The second reading portion 102 includes back surface LEDs 103a and 103b, a plurality of mirrors 104a, 104b and 104c, and a back surface reading sensor 108. Further, the ADF 81 includes a pair of side regulating plates 31L and 31R (FIG. 3), an original presence/absence detecting sensor 14, a post-separation sensor 15, a post-drawing sensor 16, a registration sensor 17, a read sensor 18, and a discharge sensor 19. The post-separation sensor 15 as a first detecting portion is disposed downstream of the separation nip N with respect to a sheet feeding direction CD and detects the original fed. The post-drawing sensor 16 as a second detecting portion is disposed downstream of the post-separation sensor 15 with respect to the sheet feeding direction and detects the original fed.

Figure 4:
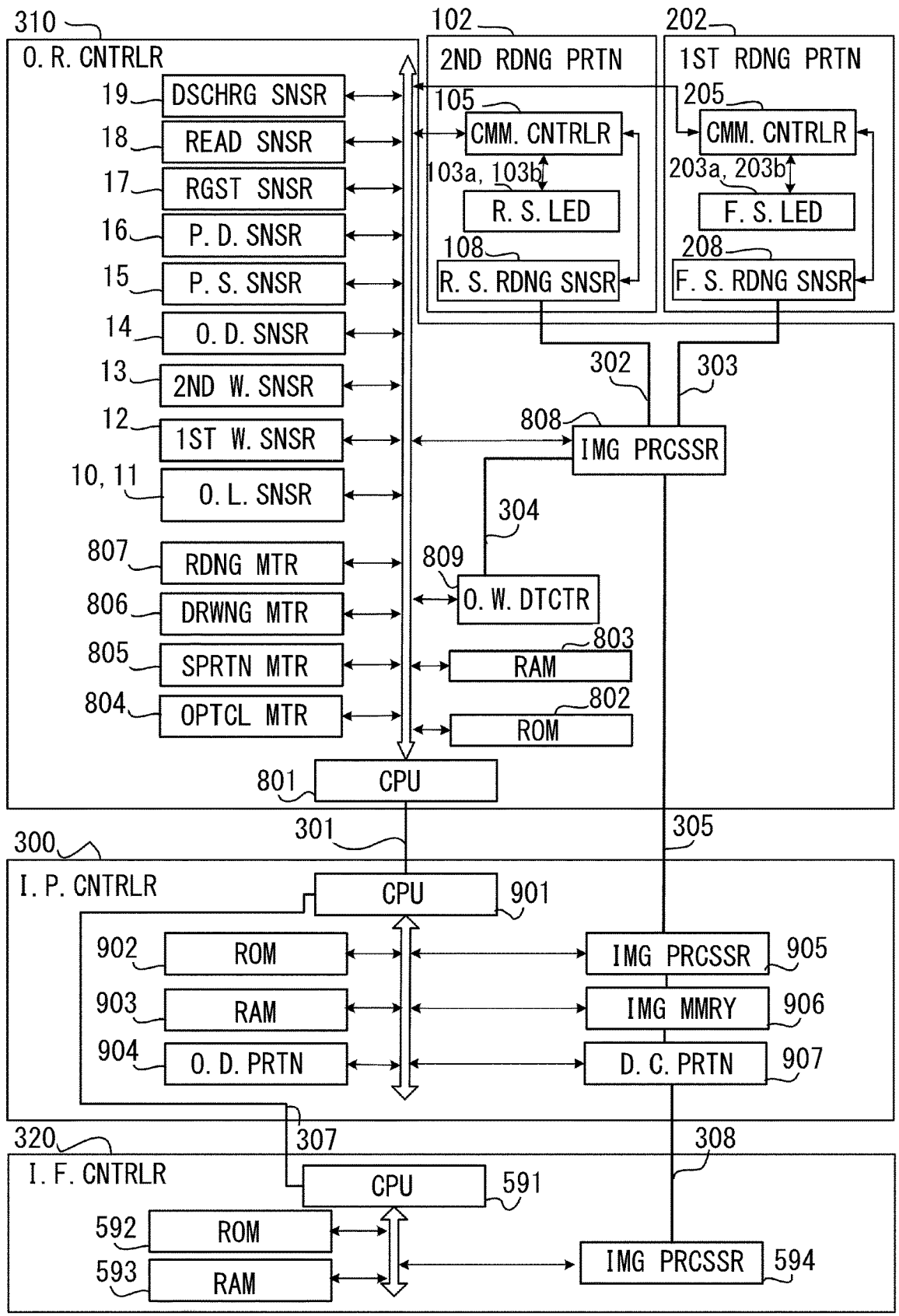
FIG. 4 is a block diagram showing a control system of the printer.

The reading unit 82 include a platen glass 201, a shading white plate 206, an original supporting platen glass 209, and a first reading portion 202 as a reading portion. The first reading portion 202 includes front surface LEDs 203a and 203b, a plurality of mirrors 204a, 204b and 204c, and a front surface reading sensor 208. The first reading portion 202 is fixed to an unshown wire and is constituted so as to be movable in a sub-scan direction which is a left-right direction in FIG. 2 by driving the wire by an optical motor 804 (FIG. 4). Incidentally, the front surface LEDs 203a and 203b and the back surface LEDs 103a and 103b are not limited to LEDs, but other illumination devices such as xenon lamps are also applicable. Further, as the front surface reading sensor 208 and the back surface reading sensor 108, photoelectric conversion elements such a CCD sensors, CIS sensors and CMOS sensors are applicable.

The image reading apparatus 80 read image information from the original in an operation in a skimming-through reading mode in which an original image is scanned with light while feeding the original D, stacked on the original tray 30, by the ADF 81 and in an operation in a fixed reading mode in which the original placed on the original supporting platen glass 209 is scanned with light. The skimming through reading mode is selected in the case where the original stacked on the original tray 30 is detected by the original presence/absence detecting sensor 14 or in the case where a user explicitly provides an instruction to select the skimming through reading mode through an operation display portion 904 or the like of the printer main assembly 90.

When the operation in the skimming-through reading mode is executed, the originals D are fed one by one by the feeding unit 65. Then, the original D is fed toward the platen glass 201 by the drawing roller pair 73 and the feeding roller pairs 74 and 75. The original D passing through the platen glass 201 is guided by the platen rollers 51 and 52 and the glass opposing member 76 so as not to float from the platen glass 201. Incidentally, the original D forms a loop by abutting against a nip of the feeding roller pair 74 put in a rest state, so that oblique movement of the original D is corrected. Further, without making the correction of the oblique movement, the image of the original D is optically read and thereafter the read image may also be subjected to rotation correction.

Then, the image on a first surface (front surface) of the original D is read by a first reading portion 202 through the platen glass 201. Specifically, the original D during feeding is irradiated with light emitted from the front surface LEDs 203a and 203b, so that reflected light from the original D is guided to the front surface reading sensor 208 through the mirrors 204a, 204b and 204c. Then, the guided light is imaged on the front surface reading sensor 208 and is photoelectrically converted, so that image information is sent to a CPU 801 (FIG. 4). Thus, the first reading portion 202 reads the image information recorded on the original D, line by line.

The original D passed through the platen glass 201 is subjected to reading of an image on a second surface (back surface) by the second reading portion 102 while being fed by the feeding roller pair 77. The reading of the image on the original D by the second reading portion 102 is similar to the operation (reading) of the first reading portion 202, and therefore will be omitted from description. Incidentally, it is not necessarily required that the images on the double surfaces (sides) of the original D are read, but the image on only one of the first surface and the second surface may also be read. Then, the original D subjected to the image reading is discharged onto the discharge tray 20 by the discharging roller pair 55 as an original discharging portion.

On the other hand, the fixed reading mode is selected in the case where the original placed on the original supporting platen glass 209 is detected by the apparatus or in the case where the user explicitly provides an instruction to select the fixed reading mode through the operation display portion 904 or the like of the printer main assembly 90. In this case, the original on the original supporting platen glass 209 is immovable, and the first reading portion 202 moves along the original supporting platen glass 209. Then, the original is scanned with light emitted from the front surface LEDs 203a and 203b. Image information photoelectrically converted by the front surface reading sensor 208 is sent to the CPU 801 (FIG. 4).

Figure 3:
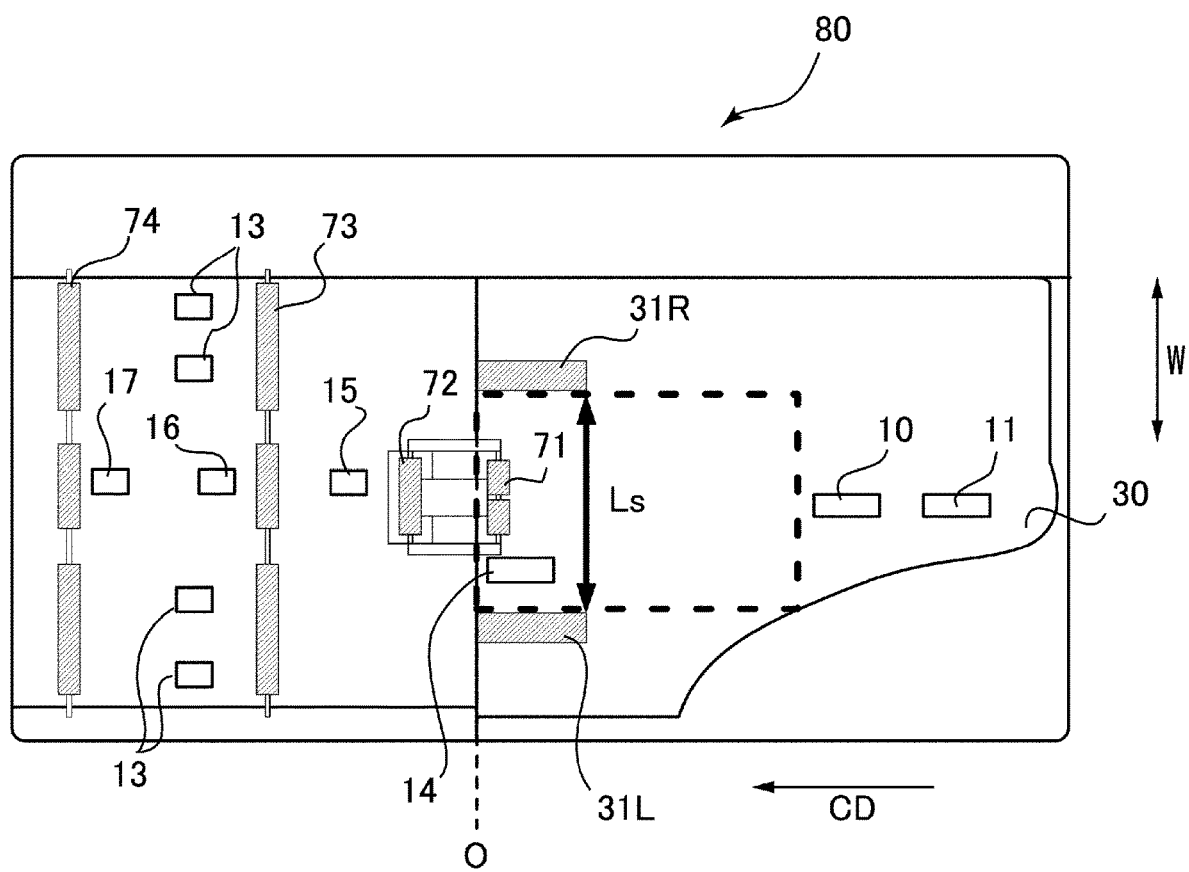
FIG. 3 is a sectional view showing an ADF.

FIG. 3 is a sectional view showing the ADF 81. As shown in FIG. 3, the user stacks the originals in a position indicated by a broken line on the original tray 30, and then end portion positions of the originals with respect to a widthwise direction W are regulated by the side regulating plates 31L and 31R. The broken line of FIG. 3 corresponds to an original size of an A4R size. Then, the originals stacked on the original tray 30 are detected by the original presence/absence detecting sensor 14.

Further, as regards the originals stacked on the original tray 30, the original size with respect to the widthwise direction W is detected by a first width detecting sensor 12 (FIG. 4) changing in output value depending on the positions of the side regulating plates 31L and 31R. Each of the side regulating plates 31L and 31R is provided with a rack portion, and by engagement of these (two) rack portions through a pinion, the side regulating plates 31L and 31R are interrelated with each other so as to move toward and away from each other in the widthwise direction. The first width detecting sensor 12 is constituted by, for example, a volume sensor for detecting a rotation amount of the pinion. Further, as regards the originals stacked on the original tray 30, a length of the originals with respect to the sheet feeding direction CD is detected by original length detecting sensors 10 and 11.

The original fed by the feeding roller 71 is, as shown in FIGS. 2 and 3, detected in the order of the post-separation sensor 15, the post-drawing sensor 16, the registration sensor 17, the read sensor 18 and the discharging sensor 19. Further, with respect to the sheet feeding direction CD, between the drawing roller pair 73 and the feeding roller pair 74, second width detecting sensors 13 are provided and detect a length of the original with respect to the widthwise direction W (hereinafter, this length is simply referred to as "width").

[Controller]

FIG. 4 is a block diagram showing a control system of the printer 100 according to this embodiment. The control system of the printer 100 includes an original reading controller 310, an image processing controller 300 and an image forming controller 320.

The original reading controller 310 includes the CPU 801, a ROM 802 and a RAM 803. The CPU 801 controls the respective units. In the ROM 802, a control program is stored. In the RAM 803, input data and data for operation are stored, and in addition, the RAM 803 is used as an operation area of the OPU 801.

To the CPU 801, an optical motor 804, a separation motor 805, a drawing motor 806, a reading motor 807, the original length detecting sensors 10 and 11, the first width detecting sensor 12, the second width detecting sensors 13, and the original presence/absence detecting sensor 14 are connected. Further, to the CPU 801, the post-separation sensor 15, the post-drawing sensor 16, the registration sensor 17, the read sensor 18 and the discharge sensor 19 are connected.

The drawing motor 806 drives the drawing roller pair 73 and the feeding roller pair 74. The reading motor 807 drives the feeding roller pair 75 and 77, the platen rollers 51, 52, 53 and 54, and the discharging roller pair 55. The optical motor 804, the separation motor 805, the drawing motor 806 and the reading motor 807 are pulse motors, and the CPU 801 controls these motors while counting the number of driving pulses of these motors, and thus manages the number of rotations of each of the motors.

Here, the number of driving pulses of the drawing motor 806 is counted from turning-on of the post-drawing sensor 16 to turning-off of the post-drawing sensor 16 during feeding of the original. Then, the CPU 801 is capable of calculating the length of the original by the counted number of driving pulses of the drawing motor 806 and a feeding distance per (one) pulse of the original by the post-drawing sensor 16. However, the calculated length of the original causes an error of several mm due to a characteristic such that feeding efficiency of the roller fluctuates.

Incidentally, in this embodiment, the drawing roller pair 73 is higher in feeding efficiency than the feeding roller 71 and the feed roller 72, and therefore, the original length is calculated by using the driving pulse number of the drawing motor 806 for driving the drawing roller pair 73, but the present invention is not limited thereto. For example, the original length may also be calculated by using the driving pulse number of the separation motor 805 or the driving pulse number of the reading motor 807. As regards the drawing roller pair 73, when the drawing roller pair 73 nips and feeds the original, the original is also held by the feed roller 72 and the feeding roller 71 which are disposed upstream of the drawing roller pair 73 with respect to the sheet feeding direction CD, and therefore, the drawing roller pair 73 is higher in feeding efficiency than the rollers 71 and 72.

Further, the CPU 801 is also capable of detecting the original length by the original length detecting sensors 10 and 11. For example, it is assumed that a distance from the leading end position O of the original shown in FIG. 3 to a detection position of the original length detecting sensor 10 is 220 [mm] and that a distance from the leading end position O to a detection position of the original length detecting sensor 11 is 330 [mm].

Then, when the original presence/absence detecting sensor 14 is in on state and the original length detecting sensors 10 and 11 are in an off state, the length of the original stacked on the original tray 30 is detected as being less than 220 [mm], when the original presence/absence detecting sensor 14 is in the on state, the original length detecting sensor 10 is in an on state and the original length detecting sensor 11 is in the off state, the length of the original stacked on the original tray 30 is detected as being 220 [mm] or more and less than 330 [mm]. When the original presence/absence detecting sensor 14 and the original length detecting sensors 10 and 11 are in the on state, the length of the original stacked on the original tray 30 is detected as being 330 [mm] or more.

Further, the CPU 801 is connected to the back surface LEDs 103a and 103b and the back surface reading sensor 108 through a communication controller 105 of the second reading portion 102. The CPU 801 is connected to the front surface LEDs 203a and 203b and the front surface reading sensor 208 through a communication controller 205 of the first reading portion 202. The image data read by the back surface reading sensor 108 and the front surface reading sensor 208 are sent to the image processing portion 808 through image communication portions 302 and 303, respectively.

The image processing portion 808 subjects the received image data to shading (process) and various filtering processes. Further, the image processing portion 808 is connected to an original width portion 809 through an image communication portion 304, and the original width portion 809 is capable of detecting the width of the original by detecting shadows of opposite end portions of the original with respect to the widthwise direction W of the original with respect to the image data. However, the detected original width causes an error of several mm due to a characteristic such that the original width is discriminated by detecting the shadows of the original.

Further, the CPU 801 notifies the image processing controller 300 of a vertical synchronizing signal which is a basis of a leading end of original image data and a horizontal synchronizing signal which is basis of a leading end of one line pixel through an image communication portion 305 in synchronism with original reading timing.

Further, the image processing controller 300 includes a CPU 901, a ROM 902 and a RAM 903, and the CPU 901 carries out data transfer about image reading control between itself and the CPU 801 through a command communication portion 301. The image data processed by the image processing portion 808 is sent to an image processing portion 905 of the image processing controller 300 through an image communication portion 305, and is subjected to predetermined image processing such as discrimination of the color and the is stored in an image memory 906. The CPU 901 controls an operation display portion 904 which is a user interface, and not only receives information inputted into the operation display portion 904 by the user but also processes input information of an image job start or the like.

Further, the image processing controller 300 includes a data communication portion 907 as a sending portion for establishing communication with an external device such as a PC, a server or the like on a network in accordance with a communication standard such as Ethernet (registered trademark). The image processing controller 300 converts the image data sent from the original reading controller 310 into a predetermined file format and is capable of sending the converted image data to the external device through the network by the data communication portion 907.

The image forming controller 320 includes a CPU 591, a ROM 592 and a RAM 593, and controls the respective units in an image forming process of the printer main assembly 90. The CPU 591 carries out transfer of data relating to the image formation subsequent original between itself and the CPU 901 through a command communication portion 307. The image data stored in the image memory 906 of the image processing controller 300 is sent to an image processing portion 594 of the image forming controller 320 through an image communication portion 308 and then is converted into an output signal of the laser scanner 231.

[Original Feeding Mode]

Next, an original feeding mode in which the printer 100 according to this embodiment is operable will be described. As regards the ADF 81 of the printer 100, when the skimming-through reading of the original D is carried out, one of a plurality of original feeding modes is selected when skimming-through reading of the original D is carried out. The original reading mode includes, for example, a same size reading mode in which a plurality of originals with the same size stacked on the original tray 30 are fed and a mixed reading mode in which a plurality of originals with different sizes stacked on the original tray 30 are fed. These original feeding modes are selected by operating the operation display portion 904 shown in FIG. 5 by the user.

Figure 5:
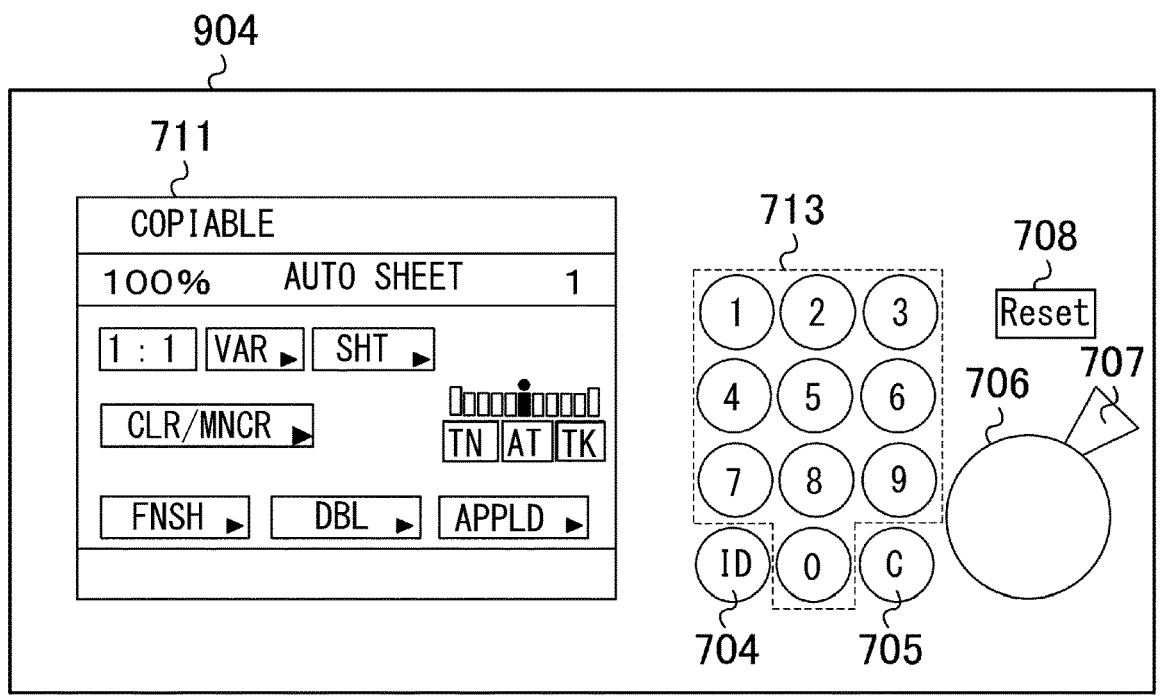
FIG. 5 is a schematic view showing an operation display portion.

As shown in FIG. 5, the operation display portion 904 includes a start key 706 for starting an image forming operation, a stop key 707 for stopping the image forming operation, and a ten key 713 for making numerical setting. Further, the operation display portion 904 includes an ID key 704, a clear key 705, and a reset key 708. On a left side of the operation display portion 904, a display portion 711 constituted by a touch panel or the like is provided, and is capable of displaying software keys capable of being touch-operated by the user.

Figure 6:
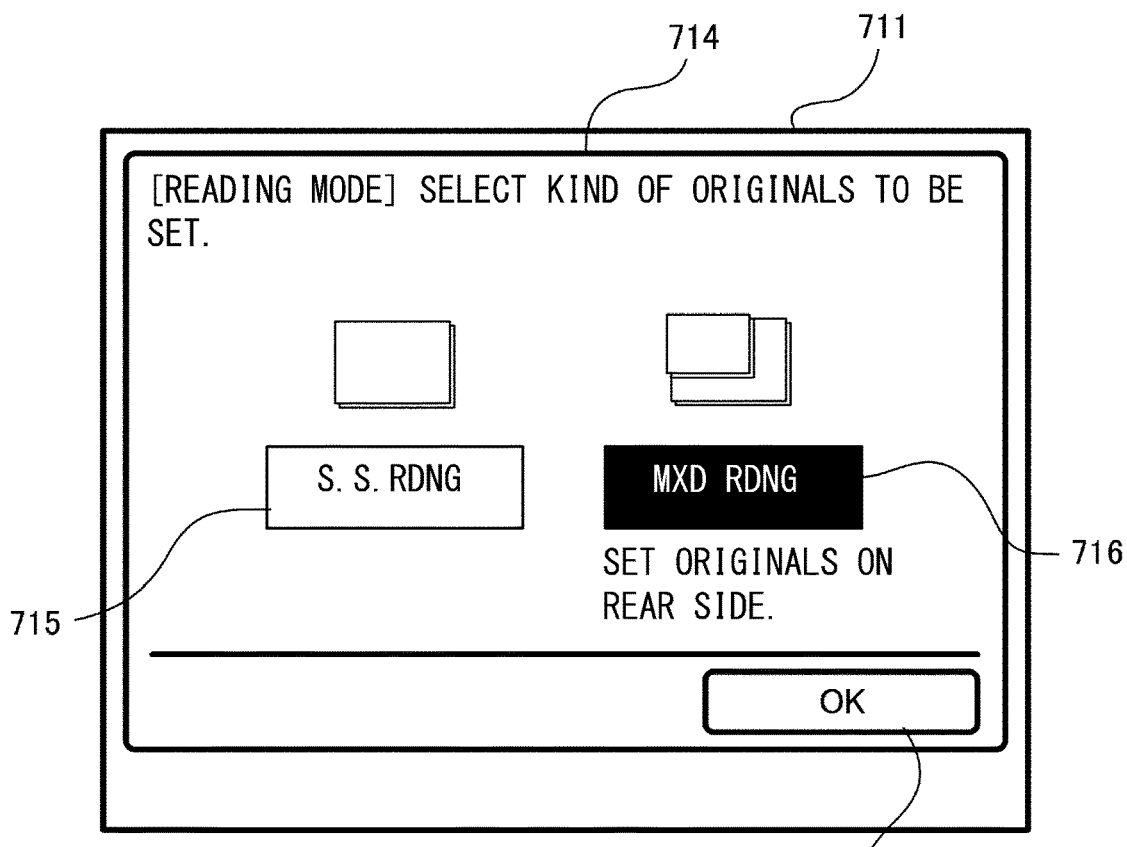
FIG. 6 is a schematic view showing an original feeding mode setting screen.

At the display portion 711 of the operation display portion 904, as shown in FIG. 6, an original feeding mode setting screen 714 can be displayed by being operated by the user. On the original feeding mode setting screen 714, a "same size reading mode" key 715, a "mixed reading mode" key 716, and an "OK" key 717 are displayed. The user is capable of selecting a desired original feeding mode by touch-operating the "OK" key 717 after touch-operating either one of the "same size reading mode" key 715 and the "mixed reading mode" key 716.

Figure 7:
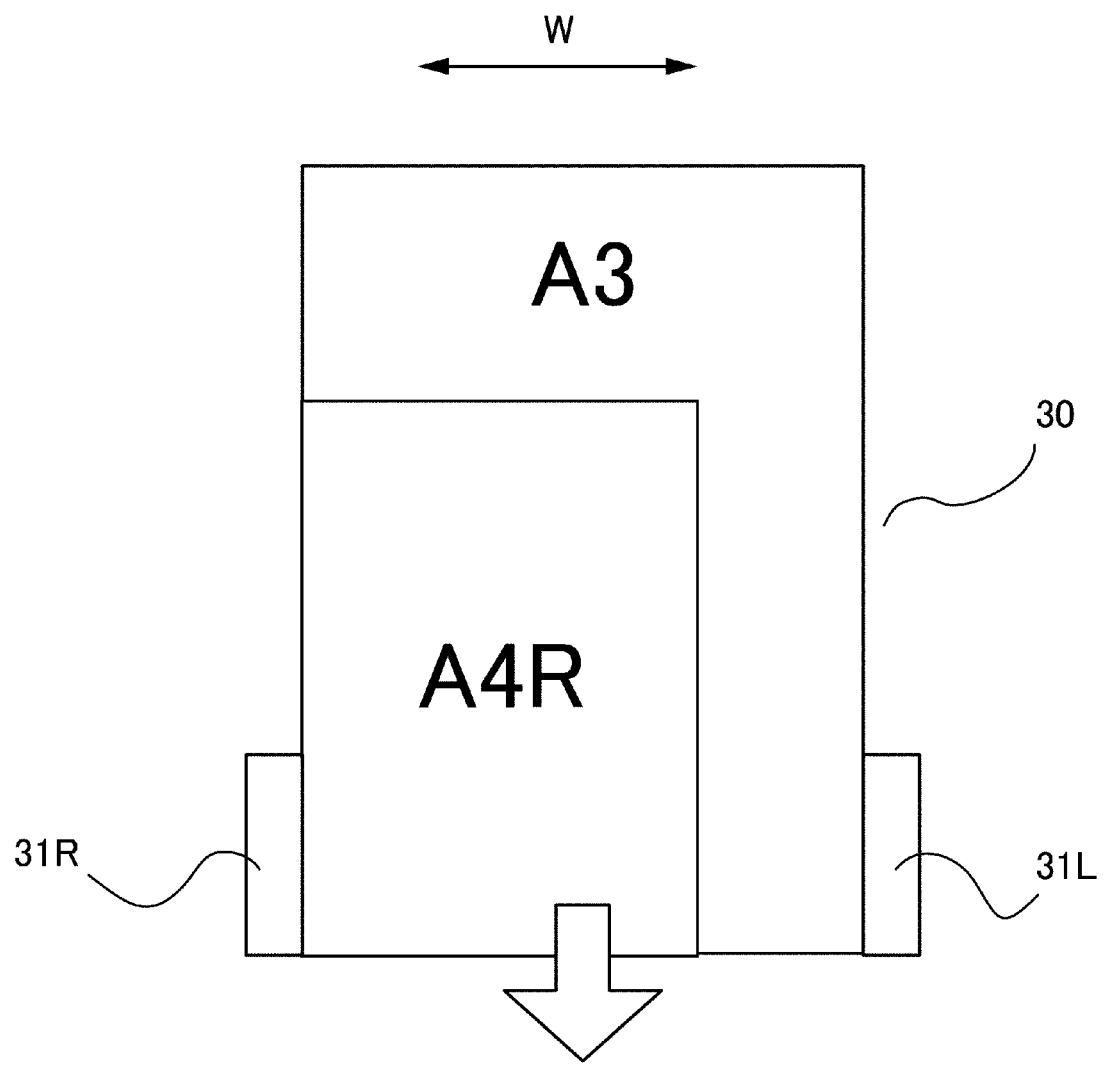
FIG. 7 is a top plan view showing a state in which originals with a plurality sizes are stacked in mixture on an original tray.

The same size reading mode as a first original reading mode is principally selected when originals with the same size are stacked on the original tray 30 and are subjected to a skimming-through reading operation, and is a mode in which when a distance between a current original and a subsequent original (hereinafter, this distance is referred to as a sheet interval) is a first distance, the subsequent original is fed. Further, the mixed reading mode as a second original reading mode is principally selected when originals with a plurality of sizes are stacked on the original tray 30 and are subjected to the skimming-through reading operation, and is a mode in which when the sheet interval is a second distance larger than the first distance, the subsequent original is fed. For example, as shown in FIG. 7, in the case where an A4R-size original and an A3-size original are stacked in mixture on the original tray 30, normally, the mixed reading mode is selected.

In this case, the A3-size original is longer in width than the A4R-size original, so that the A3-size original is positioned with respect to the widthwise direction W by the side regulating plates 31L and 31R. On the other hand the A4R-size original is not positioned with respect to the widthwise direction W by the side regulating plates 31L and 31R. For this reason, the first width detecting sensor 12 for detecting the width of the original stacked on the original tray 30 on the basis of the side regulating plates 31L and 31R cannot accurately detect the A4R-size original. Therefore, in the mixed reading mode, as described later, the size of the original fed by the feeding roller 71 is detected every time.

[Same Size Reading Mode]

Figure 8:
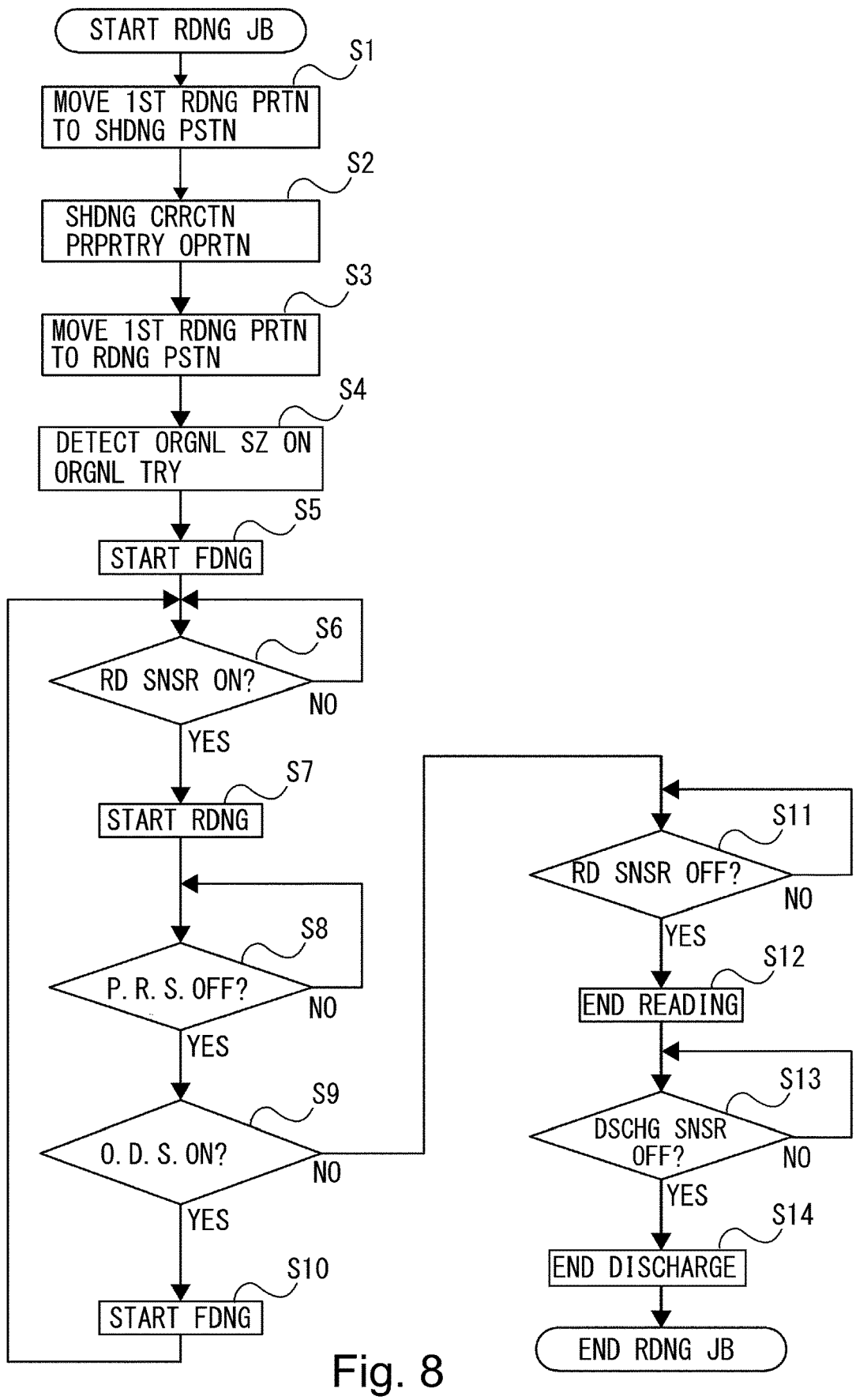
FIG. 8 is a flowchart showing a process of an ADF reading job in a same size reading mode.

Next, the same size reading mode will be described specifically. FIG. 8 is a flowchart showing respective processes in an operation in the same size reading mode. In the following, a job, such as a scan job or a copy job, in which the original is read by a skimming-through operation is referred to as an ADF reading job, and control of the operation in the same size reading mode when the ADF reading job is inputted will be described. Incidentally, an operation when a second surface (side) of the original is read is similar to an operation when a first surface (side) of the original is read, and therefore, in the following, the case where only the first surface of the original is read will be described as an example.

The scan job is a job in which an image of the original is read by the first reading portion 202 and data depending on the read image data is sent to the external device by the data communication portion 907. The copy job is a job in which the image of the original is read by the first reading portion 202 and on the basis of the read image data, the image is printed (formed) on the recording paper by the image forming portion 230. The CPU 801 is capable of executing a copying operation in the copy job and a sending operation in the scan job. Incidentally, in the case where the copying operation is executed in the same size reading mode, a size of the recording paper to be printed is determined depending on an original size discriminated in a step S4 described later. Further, in the case where the sending operation is executed in the same size reading mode, information on the original size discriminated in the step S4 is added to the data sent to the external device.

As shown in FIG. 8, when the ADF reading job is started, the CPU 801 receives information inputted to the operation display portion 904 by the user and notifies the CPU 801 of the start of the ADF reading job. Then, the CPU 801 drives the optical motor 804 and causes the first reading portion 202 to move to a shading position opposing the shading white plate 206 (step S1).

Then, the CPU 801 causes the first reading portion 202 to read the shading white plate 206, thus performing a shading correction preparatory operation (step S2). Specifically, the CPU 801 first calculates an offset value of a black level and shading coefficient of a white level. Then, the CPU 801 multiplies a brightness value, at the time of reading the shading white plate 206 by the first reading portion 202, by the shading coefficient and then adds the offset value of the black level to the resultant value.

Next, the CPU 801 drives the optical motor 804 and causes the first reading portion 202 to move to a reading position opposing the platen glass 201 (step S3). Then, the CPU 801 causes the sensors to detect the size of the original on the original tray 30 (step S4).

Specifically, the CPU 801 causes the first width detecting sensor 12 to detect a width between the side regulating plates 31L and 31R on the original tray 30, i.e., a width of the original. However, this width of the original is the width of the original when positions of end portions of the original with respect to the widthwise direction W are regulated by the side regulating plates 31L and 31R. For example, as shown in FIG. 3, the width Ls of the original stacked on the original tray 30 is detected. Further, a length of the original is detected by the original length detecting sensors 10 and 11. By these first width detecting sensor 12 and original length detecting sensors 10 and 11, in the same size reading mode, the size of the original to be fed is discriminated.

Then, the CPU 801 drives the separation motor 805, the drawing motor 806 and the reading motor 807, so that the respective rollers on the feeding passage are driven and thus feeding of the original is started (step S5). Incidentally, at a time of the start of the feeding of the original, there is no need to simultaneously drive all the motors consisting of the separation motor 805, the drawing motor 806 and the reading motor 807, and the motor to be driven may also be changed depending on a feeding process of the original. Further, in this embodiment, a first original (sheet) fed in the ADF reading job is referred to as D1, a second original (sheet) fed in the ADF reading job is referred to as D2, and a third original (sheet) fed in the ADF reading job is referred to as D3.

As shown in parts (a) and (b) of FIG. 9, when the feeding of the original D1 advances, the sensors are turned on in the order of the post-separation sensor 15, the post-drawing sensor 16 and the registration sensor 17. Then, the CPU 801 discriminates whether or not the read sensor 18 is turned on (step S6). In the case where the CPU 801 discriminated that the read sensor 18 is turned on (step S6: YES), the CPU 801 causes the first reading portion 202 to start reading of an image of the original D1 (step S7).

In the same size reading mode, as described in the step S4, the CPU 801 discriminates the original size on the basis of detection results of the first width detecting sensor 12 and the original length detecting sensors 10 and 11. Then, the CPU 801 carries out control so that image reading by the first reading portion 202 is performed on the basis of this original size. For example, in the case of an original with an A3R size, i.e., a width of 297.0 [mm] and a length of 420.0 [mm], the image reading by the first reading portion 202 is performed in a range of the width of 297.0 [mm] and the length of 420.0 [mm].

At this time, the image read by the first reading portion 202 is sent to the image processing portion 808 through the image communication portion 303 and then is subjected to shading correction using the shading coefficient acquired in the step S2, by the image processing portion 808. On the other hand, the image processing portion 808 sends the image data to the image processing controller 300 through the image communication portion 305.

Next, the CPU 801 discriminates whether or not a trailing end of the original D1 passes through the post-separation sensor 15 and then the post-separation sensor 15 is turned off (off state) (step S8). As shown in part (a) of FIG. 10, in the case where the CPU 801 discriminated that the post-separation sensor is turned off (step S8: YES), the CPU 801 discriminates whether or not the original presence/absence detecting sensor 14 is turned on (step S9). In the case where the CPU 801 discriminated that the original presence/absence detecting sensor 14 is turned on (on state) (step S9: YES), the CPU 801 starts feeding of a subsequent original D2 as shown in part (b) of FIG. 10 (step S10), and then the process returns to the step S6.

Thus, the steps S6 to S10 are repeated until the original presence/absence detecting sensor 14 is turned off or until the image reading of the originals in the number of sheets designated in the ADF reading job is ended. Then, as regards the original D2 and the later original(s), the first reading portion 202 is controlled for each of the originals by using the original size detected in the step S4, i.e., the same size information.

Incidentally, the step S8 is performed between the step S7 and the step S9 for convenience of explanation, but an output of the post-separation sensor 15 is monitored in all the periods from the start of the feeding of the originals to completion of discharge of the originals. That is, by a multi-task constitution performed in parallel to other processes, the detection of the trailing end of the original in the step S8 is carried out, and therefore, the step S8 is not performed by limiting timing thereof to timing shown in FIG. 8.

In the case where the CPU 801 discriminated in the step S9 that the original presence/absence detecting sensor 14 is turned off (step S9: NO), the CPU 801 discriminates whether or not the read sensor 18 is turned off (step S11). In the case where the CPU 801 discriminated that the read sensor 18 is turned off (step S11: YES), the CPU 801 ends the read of the original (step S12).

Then, the CPU 801 discriminates whether or not the discharge sensor 19 is turned off (step S13). In the case where the CPU 801 discriminated that the discharge sensor 19 is turned off (step S13: YES), the CPU 801 causes the separation motor 805, the drawing motor 806 and the reading motor 807 to stop and then performs an original discharge completion process (step S14). In the above-described manner, the ADF reading job by the operation in the same size reading mode is ended.

Thus, in the operation in the same size reading mode, for all the originals stacked on the original tray 30, the original (image) reading is carried out with respect to the same original size. In this embodiment, in the step S4, the original size is discriminated on the basis of the detection results of the first width detecting sensor 12 and the original length detecting sensors 10 and 11, and thereafter, the original size discrimination process is not performed in the same job. For that reason, through put of the original reading can be improved.

[Mixed Reading Mode]

Next, the mixed reading mode will be specifically described. FIG. 11 is a flowchart showing respective processes of an operation in the mixed reading mode. Steps S21 to S27 and S31 to S36 in FIG. 11 are the same as the steps S1 to S7 and S9 to S14, respectively, and therefore, will be appropriately omitted from description.

In the case where the copying operation is performed in the mixed reading mode, a size of the recording paper on which the image is printed is determined depending on the original size discriminated in a step S30 described later. Further, in the case where the sending operation is performed in the mixed reading mode, information on the original size discriminated in the step S30 is added to the data to be sent to the external device.

In the step S27, when the image reading of the original D1 is started, the CPU 801 detects the width of the fed original D1 from the image data read by the first reading portion 202. For example, with respect to the image is a region of a length of 100 mm corresponding to a leading end portion of the original D1, by detecting opposite end portions of the original D1 with respect to the widthwise direction W, the width of the original D1 is detected. By this, the width of the original can be quickly detected without reading all the images on the original D1.

Then, the CPU 801 discriminates whether or not the width detection of the original D1 is completed (step S28). In the case where the CPU 801 discriminated that the width detection of the original D1 is completed (step S28: YES), the CPU 801 discriminates whether or not the post-drawing sensor 16 is turned off (step S29). In the case where the CPU 801 discriminated that the post-drawing sensor 16 is turned off (step 29: YES), the CPU 801 calculates the length of the original D1 from a time from the turning-on of the post-drawing sensor 16 to the turning-off of the post-drawing sensor 16 and a feeding speed of the original D1.

Then, the CPU 801 executes the original size discrimination process by using the width and the length of the original D1 which are acquired in the steps S28 and S29 (step S30). In the original size discrimination process, the original size is discriminated by a threshold in which a predetermined margin X is provided for each of the width and the length of each of regular size such as A3R, A4, A4R, A5R, A6, B4R, B5, B5R and B6 which are shown in FIG. 12.

In this embodiment, the threshold is set by using X=5.0 mm and each of the respective sizes including A4 (width: 297.0 mm, length: 210.0 mm), B5 (width: 257.0 mm, length: 182.0 mm), A4 (width: 210 mm, length: 148.5 mm), B6 (width: 182.0 mm, length: 128.5 mm), and A6 (width: 148.5 mm, length: 105.0 mm).

FIG. 13 is a flowchart showing the original size discrimination process which is the step 30 in FIG. 11. In the following, the width of the original D1 detected in the step S28 of FIG. 11 is referred to as a detection width, and the length of the original D1 calculated in the step S29 of FIG. 11 is referred to as a detection length.

As shown in FIG. 13, when the original size discrimination process is started, the CPU 801 discriminates whether or not the detection width is larger than (297.0−5.0) mm (step S41). In the case where the CPU 801 discriminated that the detection width is larger than (297.0−5.0) mm (step S41: YES), the CPU 801 discriminates whether or not the detection length is larger than (210.0−5.0) mm (step S42). In the case where the CPU 801 discriminated that the detection length is larger than (210.0−5.0) mm (S42: YES), the CPU 801 discriminates that the size of the original D1 is the A3R size (step S43). In the case where the detection length is (210.0−5.0) mm or less (step S42: NO), the CPU 801 discriminates that the size of the original D1 is the A4 size (step S44).

In the case where the CPU 801 discriminated in the step S41 that the detection width is (297.0−5.0) mm or less (step 41: NO), the CPU 801 discriminates whether or not the detection width is larger than (257.0−5.0) mm (step S45). In the case where the CPU 801 discriminated that the detection width is larger than (257.0−5.0) mm (step S45: YES), the CPU 801 discriminates whether or not the detection length is larger than (182.0−5.0) mm (step S46). In the case where the CPU 801 discriminated that the detection length is larger than (182.0−5.0) mm (S46: YES), the CPU 801 discriminates that the size of the original D1 is the B4R size (step S47). In the case where the detection length is (182.0−5.0) mm or less (step S46: NO), the CPU 801 discriminates that the size of the original D1 is the B5 size (step S48).

In the case where the CPU 801 discriminated in the step S45 that the detection width is (257.0−5.0) mm or less (step 45: NO), the CPU 801 discriminates whether or not the detection width is larger than (210.0−5.0) mm (step S49). In the case where the CPU 801 discriminated that the detection width is larger than (210.0−5.0) mm (step S49: YES), the CPU 801 discriminates whether or not the detection length is larger than (148.5-5.0) mm (step S50). In the case where the CPU 801 discriminated that the detection length is larger than (148.5-5.0) mm (S50: YES), the CPU 801 discriminates that the size of the original D1 is the A4R size (step S51). In the case where the detection length is (148.5-5.0) mm or less (step S50: NO), the CPU 801 discriminates that the size of the original D1 is the A5 size (step S52).

In the case where the CPU 801 discriminated in the step S49 that the detection width is (210.0−5.0) mm or less (step S49: NO), the CPU 801 discriminates whether or not the detection width is larger than (182.0−5.0) mm (step S53). In the case where the CPU 801 discriminated that the detection width is larger than (182.0−5.0) mm (step S53: YES), the CPU 801 discriminates whether or not the detection length is larger than (128.5−5.0) mm (step S54). In the case where the CPU 801 discriminated that the detection length is larger than (128.0−5.0) mm (S54: YES), the CPU 801 discriminates that the size of the original D1 is the B5R size (step S55). In the case where the detection length is (128.5−5.0) mm or less (step S54: NO), the CPU 801 discriminates that the size of the original D1 is the B6 size (step S56).

In the case where the CPU 801 discriminated in the step S41 that the detection width is (182.0−5.0) mm or less (step 53: NO), the CPU 801 discriminates whether or not the detection width is larger than (148.5−5.0) mm (step S57). In the case where the CPU 801 discriminated that the detection width is larger than (148.5−5.0) mm (step S57: YES), the CPU 801 discriminates whether or not the detection length is larger than (105.0−5.0) mm (step S58). In the case where the CPU 801 discriminated that the detection length is larger than (105.0−5.0) mm (S58: YES), the CPU 801 discriminates that the size of the original D1 is the A5R size (step S59). In the case where the detection length is (105.0−5.0) mm or less (step S58: NO), the CPU 801 discriminates that the size of the original D1 is the A6 size (step S60).

In the case where the CPU 801 discriminated in the step S57 that the detection width is (148.5−5.0) mm or less (step S57: YES), the CPU 801 discriminates that the size of the original D1 is the A6 size (step S61). By the above-described steps, the original size discrimination process is ended.

As shown in FIG. 11, when the original size detection PC (step S30) is ended, the CPU 801 discriminates whether or not the original presence/absence detecting sensor 14 is turned on (step S31). In the case where the CPU 801 discriminated that the original presence/absence detecting sensor 14 is turned on (on state) (step S31: YES), the CPU 801 starts feeding of a subsequent original D2 (step S32), and then the process returns to the step S26.

Thus, the steps S26 to S32 are repeated until the original presence/absence detecting sensor 14 is turned off or until the image reading of the originals in the number of sheets designated in the ADF reading job is ended. In the mixed reading mode, also for each of the original D2 and the later original(s), the original width and the original length are detected in the steps S28 and S29, and then the original size discrimination process is carried out in the step S30. Then, the first reading portion 202 is controlled for each of the originals by using the size information on each of the originals discriminated in the step S30. The steps S33 to S36 of FIG. 11 are the same as the steps S11 to S14 of FIG. 8, and therefore, will be omitted from description.

[Difference in Through Put Between Same Size Reading Mode and Mixed Reading Mode]

In this embodiment, between the operation in the same size reading mode and the operation in the mixed reading mode, in the case where a plurality of originals including a current original and a subsequent original are continuously fed, timing when the subsequent original is fed is different, and therefore, there is a difference in throughput. In the case of the operation in the same size reading mode, when the post-separation sensor 15 is turned off (step S8: YES) and then the original presence/absence detecting sensor 14 is turned on (step S9: YES), the feeding of the subsequent original is started (step S10). In the case of the operation in the mixed reading mode, when the post-drawing sensor 16 is turned off (step S29: YES) and then the original presence/absence detecting sensor 14 is turned on (step S31: YES), the feeding of the subsequent original is started (step S32).

Thus, the post-drawing sensor 16 is disposed downstream of the post-separation sensor 15 with respect to the sheet feeding direction CD, and therefore, the sheet interval in the operation in the mixed reading mode is longer than the sheet interval in the operation in the same size reading mode, so that the throughput of the operation in the mixed reading mode becomes lower than the throughput of the operation in the same size reading mode.

Incidentally, in this embodiment, in the operation in the same size reading mode, the feeding roller 71 is controlled so that a subsequent original stacked on the original tray 30 is fed by the feeding roller 71 after the post-separation sensor 15 detects the trailing end of the current original. Further, in the operation in the mixed reading mode, the feeding roller 71 is controlled so that the subsequent original stacked on the original tray 30 is fed by the feeding roller 71 after the post-drawing sensor 16 detects the trailing end of the current original. However, the present invention is not limited to these cases, but a relative positional relationship between the current original and the subsequent original may also be appropriately set when the feeding roller 71 is controlled so that the sheet interval is longer in the operation in the mixed reading mode than in the operation in the same size reading mode.

[Comparison of Throughput Between Image Printing and Image Reading]

FIG. 14 is a table in which throughput of image printing, throughput of image reading during the operation in the same size reading mode and throughput of image reading during the operation in the mixed reading mode are compared with each other on a condition that all the original and the printing sheet as the recording paper are A4-size sheets. Particularly, in these days, speed-up of the ADF advances, so that throughput of the ADF is higher than throughput of the printer main assembly in many instances. In FIG. 14, the throughput is represented by the number of processed pages per (one) minute, and is 50 for the image printing, 100 for the image reading (same size reading mode) and 60 for the image reading (mixed reading mode).

Further, from the respective values of the throughput shown in FIG. 14, the following is understood. The image reading throughput is higher than the image printing throughput even when the image reading mode is either one of the same size reading mode and the mixed reading mode. In other words, the number of originals discharged per unit time by the discharging roller pair 55 in the operation in the mixed reading mode is larger than the number of sheets of the recording paper discharged per unit time by the discharging roller pair 260 in the copying job. Therefore, during the copying operation in which the image reading and the image printing are carried out in parallel, even when the mixed reading mode is set, the throughput does not lower. Thus, in the copying operation, the original is fed in the mixed reading mode, so that a degree of erroneous copying due to forgetfulness of setting of the mixed reading mode is reduced and thus good image reading can be performed.

On the other hand, in the case where originals in a length volume is subjected to the copying operation in the same size reading mode, there is an advantage such that a waiting time of the user who waits in front of the printer 100 until the image reading is ended becomes short. Further, a sending operation and a facsimile sending operation, which are not accompanied with the image printing, in the same size reading mode is higher in through put and productivity than in the mixed reading mode.

As described above, whether the image reading is performed in which one of the same size reading mode and the mixed reading mode is different for each of functions such as the copying function of the printer 100, the sending function in which the original is scanned and sent to the external device and a facsimile function in which the original is sent through facsimile, and is different in setting desired by users.

[Initial Setting of Original Feeding Mode]

Therefore, in this embodiment, a constitution in which initial setting (or initial setting value) of the original feeding mode including the same size reading mode and the mixed reading mode is capable of being made (set) independently for each of the copying operation, the scanning and sending operation and the facsimile sending operation is employed.

FIG. 15 is a schematic view showing a change screen 721 on which the initial setting of the original feeding mode is changed. Incidentally, "initial setting (or initial setting value)" in this embodiment refers to a regulation (control) value used in the case where the user does not make setting on a setting screen for the copying and sending jobs, and is also called "default setting (or default setting value). For example, in the case where the default setting is the "mixed reading mode", when user setting relating to the image reading mode is not made for a job to be executed, an image reading process is executed in accordance with the mixed reading mode set as the default setting. On the other hand, in the case where the user explicitly makes setting relating to the "same size reading mode" as the image reading mode, the image reading process is executed in accordance with the set same size reading mode, and the setting is released after the job is ended, and then is returned to the "mixed reading mode" which is the default setting value.

As shown in FIG. 15, on a display portion 711 of the operation display portion 904 (FIG. 5), the change screen 721 can be displayed. The change screen 721 includes a first setting region 732 for changing first setting information indicating whether which one of the same size reading mode and the mixed reading mode is set at the initial setting for the sending operation in the scanning job. Further, the change screen 721 includes a second setting region 731 for changing second setting information indicating whether which one of the same size reading mode and the mixed reading mode is set at the initial setting for the copying operation in the copying job. Further, the change screen 721 includes a third setting region 733 for changing third setting information indicating whether which one of the same size reading mode and the mixed reading mode is set at the initial setting for the facsimile sending operation of the facsimile job. The facsimile job is a job in which the image of the original is read by the first reading portion 202 and read image data is sent through a communication line. The CPU 801 is capable of executing the facsimile sending operation in the facsimile job. Execution of the operation in the same size reading mode, the operation in the mixed reading mode, the copying operation, the sending operation and the facsimile sending operation is not limited to the CPU 801, but these operations may also be executed by at least one of the CPUs 591, 901 and 902.

These pieces of the first setting information, the second setting information and the third setting image form are individually stored in, for example, the ROM 802 as a stored portion, but may also be stored in either one of the ROMs 592 and 902 and the RAMs 593, 803 and 903.

The second setting region 731 includes an "ON" key 722 and an "OFF" key 723. The first setting region 732 includes an "ON" key 724 and an "OFF" key 725. The third setting region 733 includes an "ON" key 726 and an "OFF" key 727. The "ON" keys 722, 724 and 726 are keys selected for executing the mixed reading mode in the copying operation, the scanning and sending operation and the facsimile operation, respectively. The "OFF" keys 723, 725 and 727 are selected for executing the same size reading mode in the copying operation, the scanning and sending operation and the facsimile operation, respectively. Further, the change screen 721 includes an "OK" key 728.

When the user touch-operates either one of the "OK" keys 722, 724 and 726 and the "OFF" keys 723, 725 and 727, the touch-operated key is highlighted in color and is put in a selected state. In the selected state, when the "OK" key 728 is touch-operated, the setting is finalized. Thus, the first setting information, the second setting information and the third setting information are independently changeable as to selection of either one of the same size reading mode and the mixed reading mode.

Incidentally, in this embodiment, the first setting information, the second setting information and the third setting information is independently changeable on the change screen 721, but the present invention is not limited thereto. For example, the first setting information, the second setting information and the third setting information may also be changed by information processing device, such as a smart-phone or another computer, connected to the printer 100.

As described above, in this embodiment, it is possible to make the initial setting as to whether which one of the same size reading mode and the mixed reading mode is selected every function (copying function, scanning and sending function, facsimile function) of the printer 100. By this, a degree of freedom in mode setting by the user, so that usability can be improved.

For example, in a printer in which the throughput is higher in the image reading in the mixed reading mode than in the image printing, as regards the copying operation, the mixed reading mode is set at the default setting. Further, as regards the scanning and sending operation in which the original is scanned and sent to the external device and the facsimile sending operation in which the original is sent through facsimile, the same size reading mode is set at the default setting. By this, a degree of erroneous copying due to setting forgetfulness of the mixed reading mode is reduced without lowering the throughput of the copying operation, so that good image reading can be performed. Particularly, in an initial state during shipping of a product, in the ROM 802, the second setting information indicating a message to the effect that the operation in the mixed reading mode is executed when the copying job is inputted may preferably be stored.

Further, as regards the scanning and sending operation and the facsimile sending operation, in the case where the originals with the same size are continuously read, the throughput can be improved by the operation in the same size reading mode. Thus, every function of the printer 100, the original feeding mode is made settable, so that productivity and usability can be improved.

Further, the change screen 721 is a single screen including all the first setting region 732, the second setting region 731 and the third setting region 733 and is capable of changing setting for each of the copying operation, the scanning and sending operation and the facsimile sending operation in one screen. For this reason, usability can be improved.

Incidentally, in the above-described embodiment, in the operation in the same size reading mode, the original size is discriminated on the basis of detection results of the first width detecting sensor 12 and the original length detecting sensors 10 and 11. Further, in the operation in the mixed reading mode, the original size is discriminated on the basis of the image data read by the first reading portion 202, and the time from the turning-on to the turning-off of the post-drawing sensor 16 and the feeding speed of the original. However, the present invention is not limited to these cases. For example, in the operation in the same size reading mode, the original size may also be discriminated on the basis of the image data read by the first reading portion 202, the time from the turning-on to the turning-off of the post-drawing sensor 16, and the feeding speed of the original. Further, the length of the original may also be calculated by using a detection result of either one of the sensors disposed on the feeding passage of the ADF 81.

Further, in the above-described embodiment, every function of the printer 100, setting as to the selection of either one of the same size reading mode and the mixed reading mode is made by the change screen 721, but the present invention is not limited thereto. For example, a constitution in which every function of the printer 100, setting as to the selection of either one of the same size reading mode and the mixed reading mode is stored in the ROM 802 in advance during shipping of a product and is mode unchangeable after the shipping of the product may also be employed.

Further, in the above-described embodiment, description was made using the printer 100 of an electrophotographic type, but the present invention is not limited thereto. For example, the present invention is also applicable to an image forming apparatus of an ink jet type in which an image is formed on a sheet by ejecting an ink liquid from nozzles.

Other Embodiments

The present invention can also be realized by a process in which a program for realizing one or more function in the above-described embodiment is supplied to a system or an apparatus through a network or a storing medium and in which one or more processor in the system or the apparatus reads and executes the program. Further, the present invention can also be realized by a circuit (for example, ASIC) for realizing one or more function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-218301 filed on Dec. 2, 2019, which is hereby incorporated by reference herein in its entirety.

What is claimed is:

1. An image forming apparatus comprising:
an original reader configured to perform an original reading process for reading an original and generating image data corresponding to the read original;
an image former configured to perform an image forming process for forming an image on a recording sheet based on the image data generated by the original reading process;
a sender configured to perform a sending process for sending image data generated by the original reading process to an external device; and
a mode setter configured to set one of a plurality of original reading modes including a first original reading mode and a second original reading mode,
the first original reading mode being a mode for said original reader to read originals of the same size, and
the second original reading mode being a mode for said original reader to read originals of different sizes; and
a controller configured to control said original reader and said image former to execute a copy job, and configured to control said original reader and said sender to execute a sending job,
the copy job including the original reading process and the image forming process, and
the send job including the original reading process and the sending process,
wherein said mode setter is configured to independently set, for the copy job and the sending job, a default value indicating the first original reading mode or the second original reading mode, the default value being a value used when setting on the image reading mode is not made by a user for a job.

2. An image forming apparatus according to claim 1, further comprising:
feeder configured to feed originals stacked on an original tray;
separator configured to separate the originals, fed by said feeder, one by one in a separation nip;
a first detector provided downstream of the separation nip with respect to a feeding direction of the original and configured to detect the original fed along a feeding passage; and
a second detector provided downstream of said first detector with respect to the feeding direction and configured to detect the original fed along the feeding passage,
wherein in the first original reading mode, after said first detector detects a trailing end of a current original, said feeder feeds a subsequent original stacked on said original tray, and
in the second original reading mode, after said second detector detects the trailing end of a current original, said feeder feeds a subsequent original stacked on said original tray.

3. An image forming apparatus according to claim 1, further comprising a feeder configured to feed the originals stacked on an original tray,
wherein in the first original reading mode, when a distance between a current original and a subsequent original is a first distance, said feeder feeds the subsequent original, and
wherein in the second original reading mode, when a distance between a current original and a subsequent original is a second distance longer than the first distance, said feeder feeds the subsequent original.

4. An image forming apparatus according to claim 1, further comprising:
a side regulating plate configured to regulate a position of an end portion, with respect to the widthwise direction of the original stacked on an original tray;
a width detecting sensor changing in output value depending on a position of said side regulating plate; and
an original length detecting sensor provided on said original tray and configured to detect a length of the stacked original with respect to a feeding direction of the original,
wherein in the first original reading mode, an original size is discriminated by said width detecting sensor and said original length detecting sensor.

5. An image forming apparatus according to claim 1, further comprising:
an original width detector configured to detect an original width of the original by detecting shadows of opposite end portions of the original with respect to a widthwise direction of the original with respect to the image data; and
a detector configured to detect presence or absence of the original fed along a feeding passage,
wherein in the second original reading mode, an original size is determined on the basis of the original width detected by said original width detector and a time from detection of a leading end of the original by said detector until a trailing end of the original is detected by said detector.

6. An image forming apparatus according to claim 1, further comprising a display configured to display a setting screen for setting the default of the original reading mode.

7. An image forming apparatus according to claim 1, further comprising:
an original discharger configured to discharge the original read by said unit reader; and
a recording sheet discharger configured to discharge the recording sheet on which the image is formed by said image former,
wherein the number of sheets of the originals discharged per unit time by said original discharger in the second original reading mode is larger than the number of sheets of the originals discharged per unit time by said recording sheet discharger in the copy job.

8. An image forming apparatus according to claim 1, wherein the first original reading mode is a mode in which an original size is discriminated on an original tray and a plurality of originals fed from said original tray are read, and
   wherein the second original reading mode is a mode in which each of original sizes of a plurality of originals fed from said original tray is discriminated during feeding thereof and each of the originals is read.

9. An image forming apparatus according to claim 8, wherein in the first original reading mode, the original reading process is executed depending on the original size detected on said original tray, and
   wherein in the second original reading mode, the original reading process is executed depending on the original size determined during feeding of the original.

10. An image forming apparatus according to claim 8, wherein said image former forms an image on the recording sheet with a sheet size determined on the basis of the original size, and
   wherein said sender sends, to the external device, data to which information on an original size is added.

* * * * *